US008163375B2

(12) United States Patent
Langvin et al.

(10) Patent No.: US 8,163,375 B2
(45) Date of Patent: Apr. 24, 2012

(54) CUSTOMIZABLE ARTICLES AND METHOD OF CUSTOMIZATION

(75) Inventors: Elizabeth Langvin, Sherwood, OR (US); David P. Jones, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 1010 days.

(21) Appl. No.: 12/123,208

(22) Filed: May 19, 2008

(65) Prior Publication Data

US 2009/0286050 A1 Nov. 19, 2009

(51) Int. Cl.
*B32B 3/10* (2006.01)
*B44C 1/16* (2006.01)

(52) U.S. Cl. .................... 428/203; 428/195.1; 428/198; 428/204; 473/604; 473/605

(58) Field of Classification Search .......... 473/604–605; 428/195.1, 198, 203, 204, 423.3
See application file for complete search history.

(56) References Cited

U.S. PATENT DOCUMENTS 2,684,775 A 7/1954 Hofe
3,091,562 A * 5/1963 Berlepsch, Jr. et al. ....... 156/245
3,580,772 A 5/1971 Ochoa
4,163,421 A 8/1979 Sihota
4,738,450 A * 4/1988 Wexler .......................... 473/598
5,310,178 A * 5/1994 Walker et al. ................. 473/605
5,649,701 A * 7/1997 Mills et al. .................... 473/604
5,832,819 A 11/1998 Widman
6,458,229 B2 * 10/2002 Dobrounig .................... 156/147
6,524,419 B1 2/2003 Dabrowski, Jr. et al.
6,548,128 B2 * 4/2003 Auld et al. ...................... 428/13
6,743,109 B2 6/2004 Kammerer, Jr. et al.
6,761,468 B1 * 7/2004 Bogal .......................... 362/208
6,835,268 B2 12/2004 Widman
2002/0119306 A1 * 8/2002 Enewoldsen et al. ......... 428/335
2004/0258942 A1 12/2004 Glenister et al.
2008/0017301 A1 1/2008 Emslander et al.

FOREIGN PATENT DOCUMENTS

JP 11-047313 2/1999

OTHER PUBLICATIONS

Notification Concerning Transmittal of International Preliminary Report on Patentability mailed Dec. 2, 2010 in International Application No. PCT/US2009/044479.
International Search Report and Written Opinion from PCT Application No. PCT/US2009/44479 mailed Sep. 16, 2009.

* cited by examiner

*Primary Examiner* — Gerard Higgins
*Assistant Examiner* — Christopher Polley
(74) *Attorney, Agent, or Firm* — Plumsea Law Group, LLC

(57) ABSTRACT

Customizable articles and a method of customization are disclosed. The method produces customizable articles having a graphic or pigment arrangement sandwiched between a film transfer layer and an exterior surface of the customizable articles. The process involves aligning a customizable article and a graphical transfer assembly on a press assembly, heating the press assembly, and applying pressure to the customizable article using the press. After removing the customizable article from the press assembly, the process comprises removal of the carrier layer and inspection of the resulting customizable article.

14 Claims, 13 Drawing Sheets

CUSTOMIZABLE ARTICLES AND METHOD OF CUSTOMIZATION

BACKGROUND OF THE INVENTION

1. Field of the Invention

The present invention relates generally to customizable articles, and more specifically, to a customization process for applying and maintaining a graphic on customizable articles.

2. Description of Related Art

Various kinds of graphical transfer processes and mechanisms have been proposed. One example is U.S. Pat. No. 3,580,772 to Ochoa that teaches a method and apparatus for transferring images onto surfaces of hollow elastomeric articles. First, a resin image is printed onto one side of a resin film. Next, varnish is applied either to a ball or the side of the film with the graphical image. The varnish acts as an adhesive. Before the varnish reaches a mordant state, the image is applied to the ball using a press. Once the varnish dries, the film is peeled off leaving the varnish and graphical image adhered to the ball.

Other graphical transfer processes use a sublimation process where the image ink is absorbed into a surface. For example, U.S. Pat. No. 5,832,819 to Widman teaches the transfer of an image to an object having a curved surface, such as a baseball. The baseball is placed on a cup or seat within a press. The image is positioned between the baseball and a heating portion of the press and aligned with a target area of the baseball. The heating portion of the press is pressed against the baseball to thermally transfer the image to the baseball. The aforementioned Widman process was improved in U.S. Pat. No. 6,835,268 to Widman, which teaches the spraying of a coating onto the baseball's target surface prior to the action of the press. The coating allows the image to be transferred at a lower temperature.

Although the related art discloses a number of methods to transferring an image to a ball, there exists a need in the art for a graphical transfer process that creates a more durable graph

SUMMARY OF THE INVENTION

A method for applying and maintaining a graphic on a customizable article and the resulting customizable article is disclosed. In one aspect, the invention provides a customizable article comprising: an exterior surface including a graphic created by a pigment arrangement; the graphic disposed between the exterior surface and a film transfer layer; the film transfer layer being larger in surface area than the graphic and encompassing the graphic; the film transfer layer having a central portion corresponding with the graphic and having a peripheral portion disposed outward from the central portion; the peripheral portion of the film transfer layer configured to bond with the exterior surface; and where the peripheral portion of the film layer stays fixed to the exterior surface.

In another aspect, the graphic is a pigment layer disposed on the exterior surface of the customizable article.

In another aspect, the graphic is made of at least one ecosolvent ink.

In another aspect, the film layer is a polyurethane layer.

In another aspect, the graphic and the film layer are disposed on a segmented portion of the exterior surface of the customizable article.

In another aspect, the invention provides a customizable article comprising: a graphic disposed between an exterior surface of a customizable member and a film transfer layer; the graphic having a first side contacting the exterior surface of the customizable article; the graphic having a second side contacting the film transfer layer; and where the film transfer layer contacts the exterior surface of the customizable article around the graphic to seal and shield the graphic when the customizable article is in use.

In another aspect, the graphic includes a picture.

In another aspect, the graphic includes text.

In another aspect, the graphic is configured to contact less than four-fifths of the film transfer layer.

In another aspect, the customizable article is a soccer ball.

In another aspect, the graphic is applied to a panel of the soccer ball.

In another aspect, the invention provides a method, for applying a graphic to a customizable member, comprising: receiving a graphic; forming a graphic transfer assembly by applying the graphic to a first side of a film transfer layer; associating the graphic transfer assembly with the customizable member; applying heat to the graphic transfer assembly; and thereby bonding the first side of the film transfer layer with an exterior surface of the customizable article.

In another aspect, the graphic transfer assembly further includes a carrier layer that is attached to a second side of the film transfer layer.

In another aspect, the step of bonding is followed by a step of removing the carrier layer to reveal the film transfer layer and the graphic.

In another aspect, a second side of the film transfer layer is disposed away from the customizable article.

In another aspect, the graphic is disposed between the film transfer layer and the exterior surface.

In another aspect, the graphic is visible through the film transfer layer.

In another aspect, the step of associating the graphic transfer assembly with the customizable article further comprises a step of aligning the customizable article on a press.

In another aspect, the step of applying heat to the transfer assembly includes a step of moving a press to an extended position to apply heat and pressure to the graphic transfer assembly.

In another aspect, a peripheral portion of the film transfer layer is configured to bond with the exterior surface and wherein the peripheral portion is disposed outwardly from a central portion of the film transfer layer that is in contact with the graphic.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Embodiments of the present invention include customizable articles and a process for applying a graphic to a customizable article so that the graphic can be applied and maintained on the customizable article. In some embodiments, the customizable article could be a type of sports equipment including, but not limited to soccer balls, basketballs, footballs and other types of objects. Although the preferred embodiment discusses sports equipment, in other embodiments, different customizable articles could be used, including, but not limited to, apparel, footwear, luggage, as well as other types of customizable articles.

Figure 1:
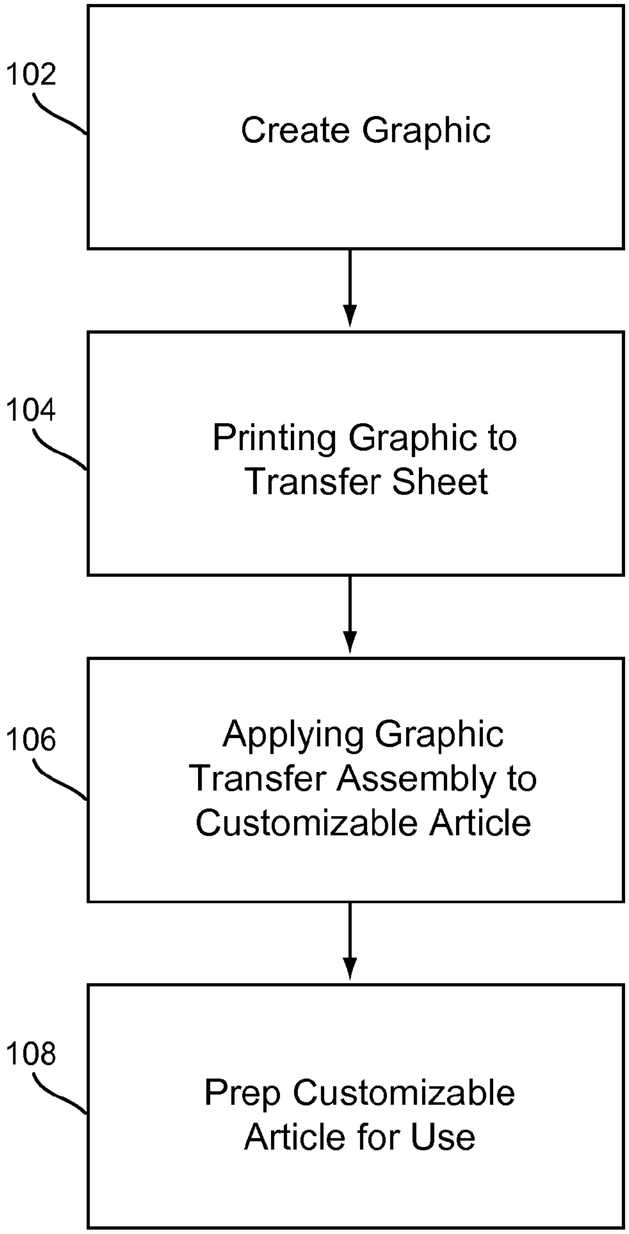
FIG. 1 is a schematic diagram of a preferred process for applying a graphic to a customizable article.

FIG. 1 is a schematic diagram of preferred process for applying a graphic to a customizable article. Referring to FIG. 1, the process may include a first step 102 of creating a graphic, a second step 104 of printing a graphic to a sheet, a third step 106 of applying a graphic transfer assembly, which includes the graphic and the sheet, to a customizable article, and a fourth step 108 of preparing the customizable article for use.

Figure 2:
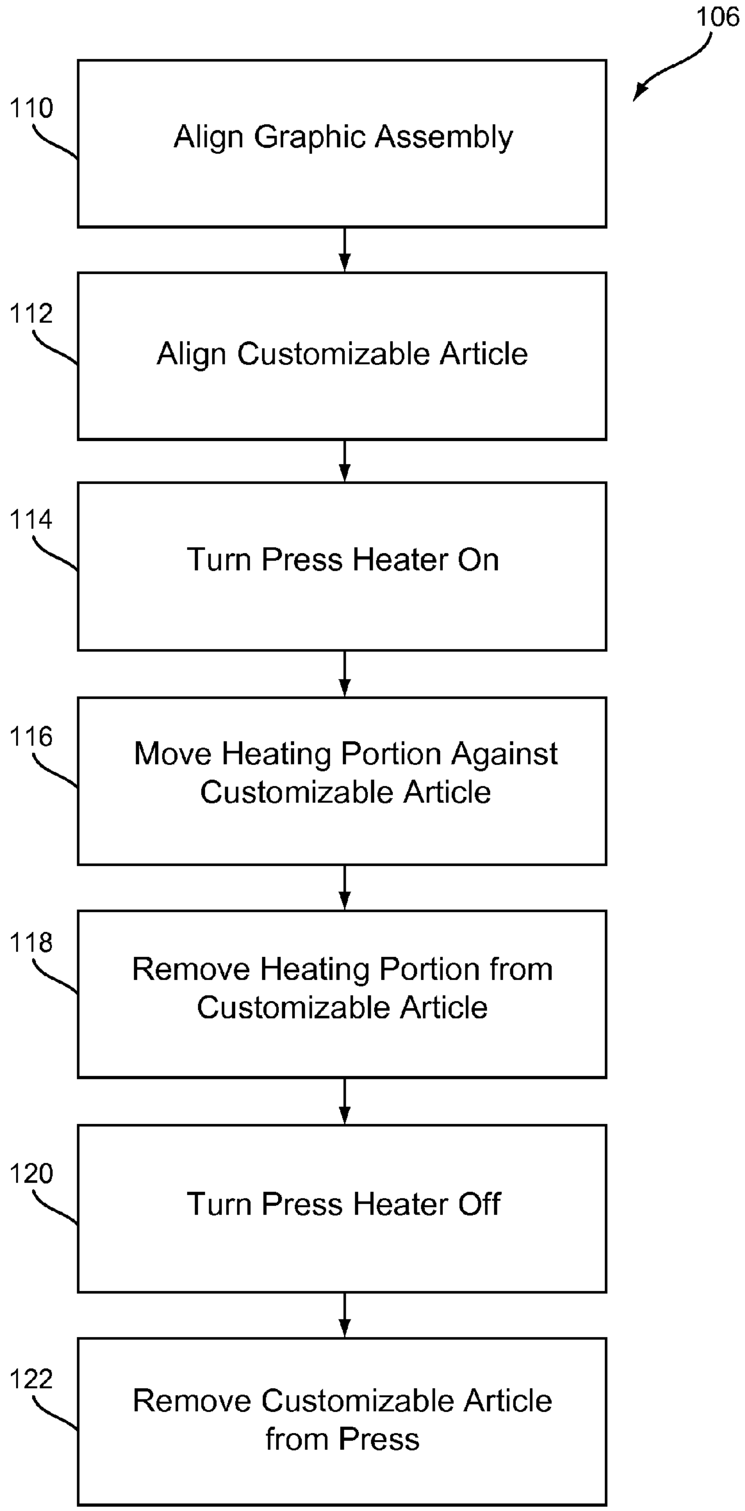
FIG. 2 is a schematic diagram of a preferred process for applying a graphic to a customizable article.

In some embodiments, the third step 106 of applying a graphic transfer assembly to a customizable article using a press may further comprise a series of two or more discrete steps. FIG. 2 is preferred embodiment of a detailed process for applying a graphic transfer assembly to a customizable article. The term "graphic transfer assembly" as used through this detailed description and in the claims refers to a combination of a graphic with a transfer layer. In some cases, a graphic transfer assembly could also include a backing or carrier layer. Referring to FIG. 2, the process for applying a graphic assembly to a customizable article may include a first step 110 of aligning the graphic assembly on a heating portion of the press, a second step 112 of aligning the customizable article on a base portion of the press, and a third step 114 of turning the heating portion of the press to the on position. The subsequent steps may include a fourth step 116 of moving the heating portion against the customizable article, a fifth step 118 of removing the heating portion from the customizable article, a sixth 120 step of turning the heating portion to the off position, and a final step 122 of removing the customizable article from the press.

Figure 3:
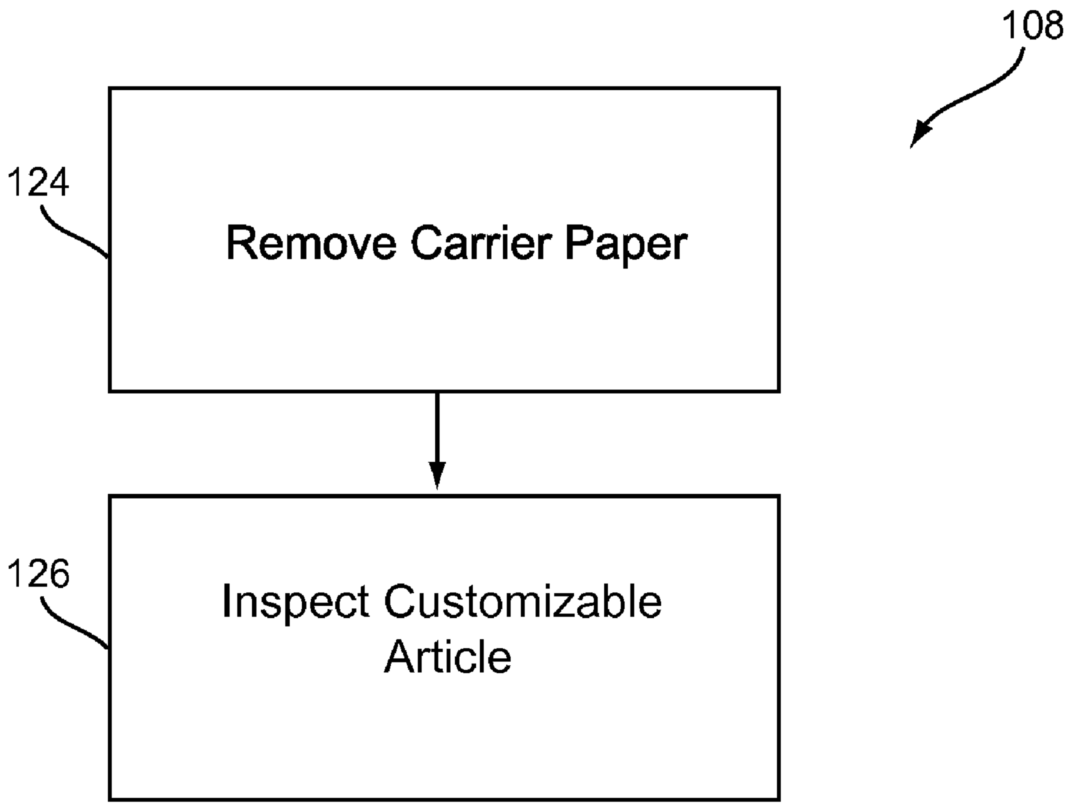
FIG. 3 is a schematic diagram of a preferred process for preparing customizable article for use.

In some embodiments, fourth step 108 of preparing the customizable article for use may include a series of additional discrete steps. FIG. 3 is a preferred embodiment of a process for preparing the customizable article for use. The process of preparing the customizable article for use may include a first step 124 of removing the carrier layer, which can be a carrier paper, and a second step 126 of inspecting the customizable article.

FIGS. 4-16 illustrate a preferred embodiment of some of the steps in a process for applying a graphic to a customizable article. It should be understood that the following embodiments are intended to be exemplary. Furthermore, in some cases, one or more of the following steps could be optional.

As previously indicated, the process for applying a graphic to a customizable article may include a first step 102 of creating a graphic. The term "graphic" as used throughout this detailed description and in the claims refers to any type of image that visually represents a person, place, thing, abstract design, or text. Furthermore, the term graphic is not limited to a single image. In some embodiments, a graphic could include two or more images.

Generally, any method of creating a graphic may be used. In some embodiments, a graphic may be sketched by hand. In other embodiments, a graphic could be created using a digital medium, such as a computer. For example, a user may create a digital image using graphic based software. Likewise, a user could select a digital image from a database of images. Furthermore, in some cases, a user could create a graphic from a digital photograph. In a preferred embodiment, a user may create a graphic with a computer.

Figure 4:
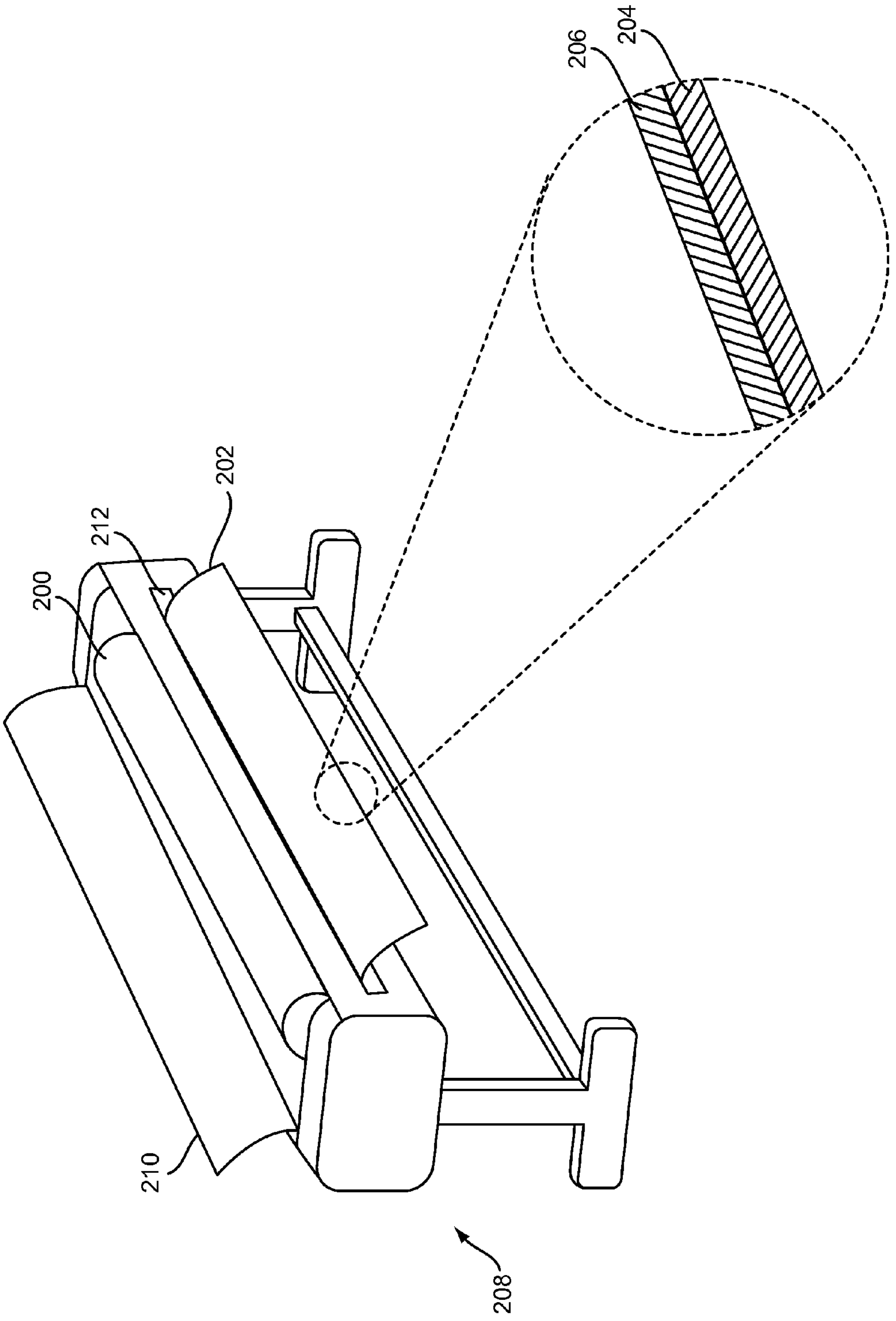
FIG. 4 is a schematic diagram of a preferred embodiment of a printer and a roll of film transfer material.

The process for applying a graphic to a customizable article may include a second step 104 of printing a graphic to a transfer sheet. FIG. 4 is a schematic diagram of a preferred embodiment of a printer and a roll of transfer material. Referring to FIG. 4, printer 208 may include a printer cover 210 and paper aperture 212. Generally, printer 208 may be any type of printer including, but not limited to, an ink jet printer, a laser printer and a dot matrix printer, as well as any other type of printer.

When printer cover 210 is in an open position, a bolt or roll of transfer material 200 may be inserted within printer 208. A roll or bolt of transfer material 200 may comprise sheet 202. In some embodiments, sheet 202 may include one or more layers. In this preferred embodiment, sheet 202 may include at least two layers. In some embodiments, a first layer may be a carrier layer 204. In some cases, carrier layer 204 could be a carrier paper. In other cases, carrier layer 204 could be another type of layer. Also, a second layer may be a film transfer layer 206. Carrier layer 204 and film transfer layer 206 are preferably provided in contact with each other.

In different embodiments, the shape and size of sheet 202 may vary. The shape and size of sheet 202 may be any shape and size capable of fitting in and being used by a selected printer. Preferably, the size of sheet 202 is larger than a graphic that may be printed on sheet 202.

In different embodiments, the shape and size of carrier layer 204 and/or film transfer layer 206 may vary. The shape and size of carrier layer 204 may be any shape and size capable of supporting film transfer layer 206. Preferably, the shape and size of carrier layer 204 is equal to the shape and size of film transfer layer 206. However, in other embodiments, the shape and size of carrier layer 204 may be larger than film transfer layer 206.

In different embodiments, the thickness of carrier layer 204 and film transfer layer 206 may vary. In some embodiments, the thickness of carrier layer 204 may be less than the thickness of film transfer layer 206. In other embodiments, the thickness of carrier layer 204 may be less than the thickness of film transfer layer 206. Preferably, the thickness of carrier layer 204 is twice as thick as film transfer layer 206. In some cases, the thickness of film transfer layer 206 may be selected so that film transfer layer 206 minimally interferes with the use of the target customizable article. For example, if the customizable article having the applied graphic is a ball, the thickness of film transfer layer 206 may be selected so that film transfer layer 206 does not substantially interfere with the rolling or bouncing of the ball.

In different embodiments, film transfer layer 206 may be made of different materials. In some embodiments, film transfer layer 206 may be made of polyurethane. In some cases, film transfer layer 206 may be made of a clear polyurethane. In such cases, film transfer layer 206 may be substantially invisible during use of the customizable article. In other cases, film transfer layer 206 may be made of a colored polyurethane.

A graphic may be printed to a sheet, as previously discussed. In particular, a graphic may be applied to a film transfer layer of a sheet. Generally, a graphic may be applied to a film transfer layer of a sheet in any manner. In some cases, the graphic can be applied to the film transfer layer of the sheet by hand. In other cases, a printer may be used to apply the graphic to the film transfer layer of the sheet. In a preferred embodiment, a digital file with an encoded graphic can be transmitted to a printer. Following this, the graphic may be printed onto the film transfer layer of the sheet.

Figure 5:
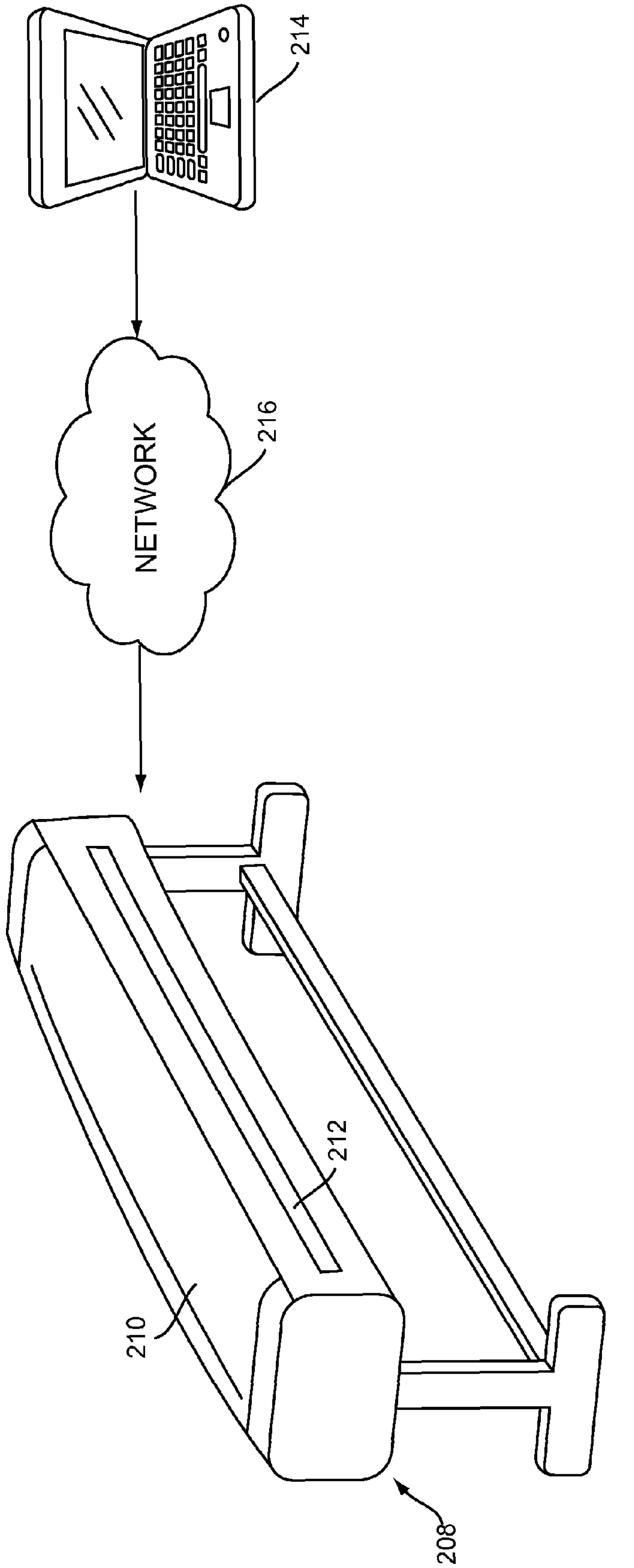
FIG. 5 is a schematic diagram of a preferred embodiment of a network and connected computer hardware.

In some embodiments, a graphic may be transferred from a computer to a printer prior to printing the graphic. FIG. 5 is a schematic diagram of a preferred embodiment of a network and connected computer hardware. Referring to FIG. 5, printer 208 may be connected to computer 214 via network 216. An individual may use computer 214 to transmit information related to a graphic to printer 208 via network 216.

Computer 214 can be any type of computer. In some embodiments, computer 214 could be a desktop. In other embodiments, computer 214 could be a laptop. In still other embodiments, computer 214 could be any type of electronic device capable of storing and transmitting information, including digital files of a graphic.

In some embodiments, the characteristics of network 216 may vary. In an embodiment, network 216 may be a local area network (LAN). In another embodiment, the LAN may have wireless capabilities. In other embodiments, network 216 connecting printer 208 and computer 214 may be removed entirely and the computer hardware connected in a different manner. For example, in another embodiment, printer 208 and computer 214 may be connected by a line, such as a cable.

Printer 208, computer 214, and network 216 may be located in a factory, retail store, or other establishment. Additionally, network 216 may be connected to the Internet. For example, if connected to the Internet, customers requiring customizable articles may transmit digital files to computer 214 from any portion of the world.

Figure 6:
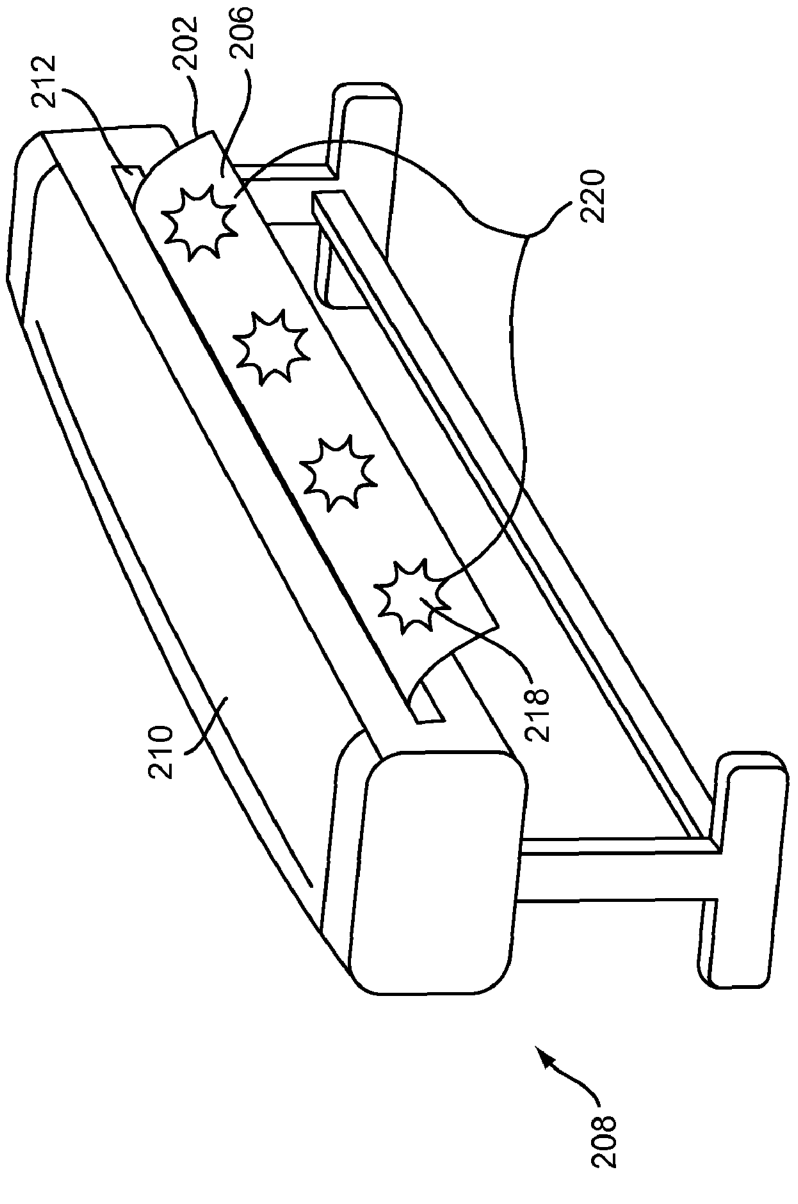
FIG. 6 is a schematic diagram of a preferred embodiment of a printer having printed a series of graphics.

Once printer 208 receives information related to the graphic, printer 208 may print the graphic onto film transfer layer 206 of sheet 202. FIG. 6 is a schematic diagram of a preferred embodiment of a printer having printed a series of graphics. Referring to FIG. 6, printer 208 may print a copy of a graphic 218 onto a surface of sheet 202. In particular, printer 208 may print a copy of graphic 218 to film transfer layer 206 of sheet 202. In some embodiments, printer 208 may print multiple graphics or multiple copies of a graphic. In other words, a group of graphics 220 may be printed for small or large lot productions.

Generally, a graphic may be applied to any type of substrate using a pigment arrangement of some kind. In the current embodiment, a graphic is formed on a film transfer layer using inks from a printer of some kind. In other embodiments, however, the graphic could be formed using other methods.

Figure 7:
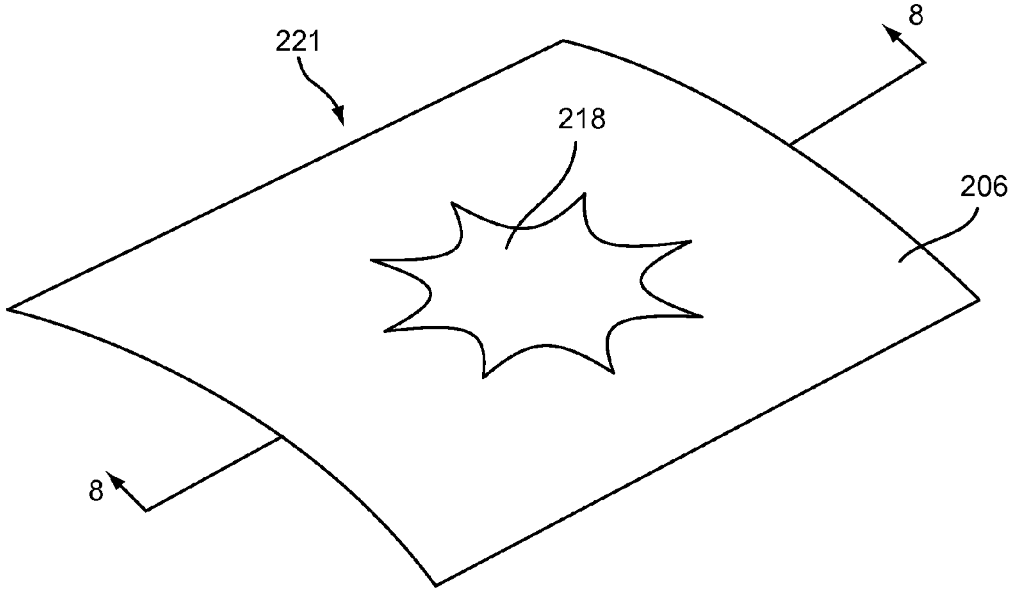
FIG. 7 is a schematic diagram of a preferred embodiment of a printed graphic transfer assembly.
Figure 8:
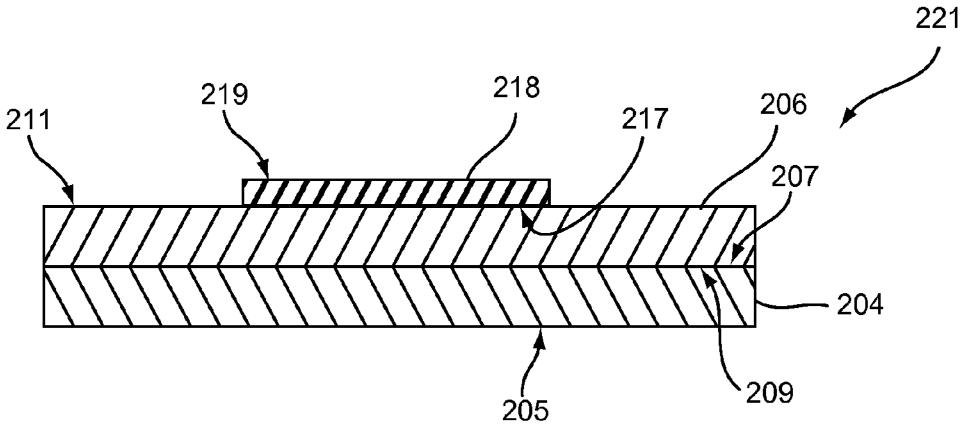
FIG. 8 is a schematic cross sectional view of a preferred embodiment of the graphic transfer assembly shown in FIG. 5.

Once printed, film transfer layer 206, including graphic 218, are removed from printer 208. FIG. 7 is a schematic diagram of a preferred embodiment of a printed graphic transfer assembly. FIG. 8 is a schematic cross sectional view of a preferred embodiment of the graphic transfer assembly shown in FIG. 7. Referring to FIGS. 7-8, printed graphic 218 and surrounding film transfer layer 206 may comprise a graphic transfer assembly 221. Graphic transfer assembly 221 is comprised of carrier layer 204, film transfer layer 206, and printed graphic layer 218.

Carrier layer 204 may include carrier layer first side 205 and carrier layer second side 207. Also, film transfer layer 206 may include film transfer first side 209 and film transfer second side 211. Likewise, printed graphic 218 may include graphic first side 217 and graphic second side 219. As previously described, carrier layer 204 and film transfer layer 206 are preferably provided in contact with each other. In this embodiment, carrier layer second side 207 of carrier layer 204 may be in contact with film transfer first side 209 of film transfer layer 206. In addition, printed graphic 218 may be disposed on film transfer layer 206. In this embodiment, film transfer second side 211 of film transfer layer 206 may be in contact with graphic first side 217 of graphic 218.

The size of printed graphic 218 may be any size compatible with the application process and the target area of the customizable article. Preferably, the size of printed graphic 218 is less than four-fifths of the area of transfer film layer 206 in graphic transfer assembly 221. In other words, at least one-fifth of the area of film transfer second side 211 outside of the perimeter of graphic 218 may be free of contact with graphic 218. However, in other embodiments, the exposed area of film transfer second side 211 may be larger or smaller. Additionally, the size of graphic 218 may be constrained by the size of a selected press and selected customizable article.

In different embodiments, the thickness of printed graphic 218 may vary. Generally, the thickness of printed graphic 218 may vary according to the type of printer used. Also, the thickness of printed graphic 218 may vary according to the use of different types of inks. Like transfer film layer 206, graphic 218 is preferably not so thick as to interfere with the use of the target customizable article.

In different embodiments, the type of ink used to print graphic 218 may vary. In some embodiments, graphic 218 may comprise an eco-solvent ink. In some cases, the eco-solvent ink may comprise multiple colors for application to a white background. In other cases, the eco-solvent ink may comprise multiple colors for application to colored backgrounds.

Following a step of printing a graphic to a sheet, a graphic transfer assembly may be applied directly to a customizable article. Generally, any method of applying a graphic transfer assembly to a customizable article may be used. In some cases, pressure can be used to apply a graphic transfer assembly to the customizable article. In other cases, heat can be used to apply a graphic transfer assembly to the customizable article. In a preferred embodiment, a heated press may be used to apply a graphic transfer assembly to the customizable article.

Figure 9:
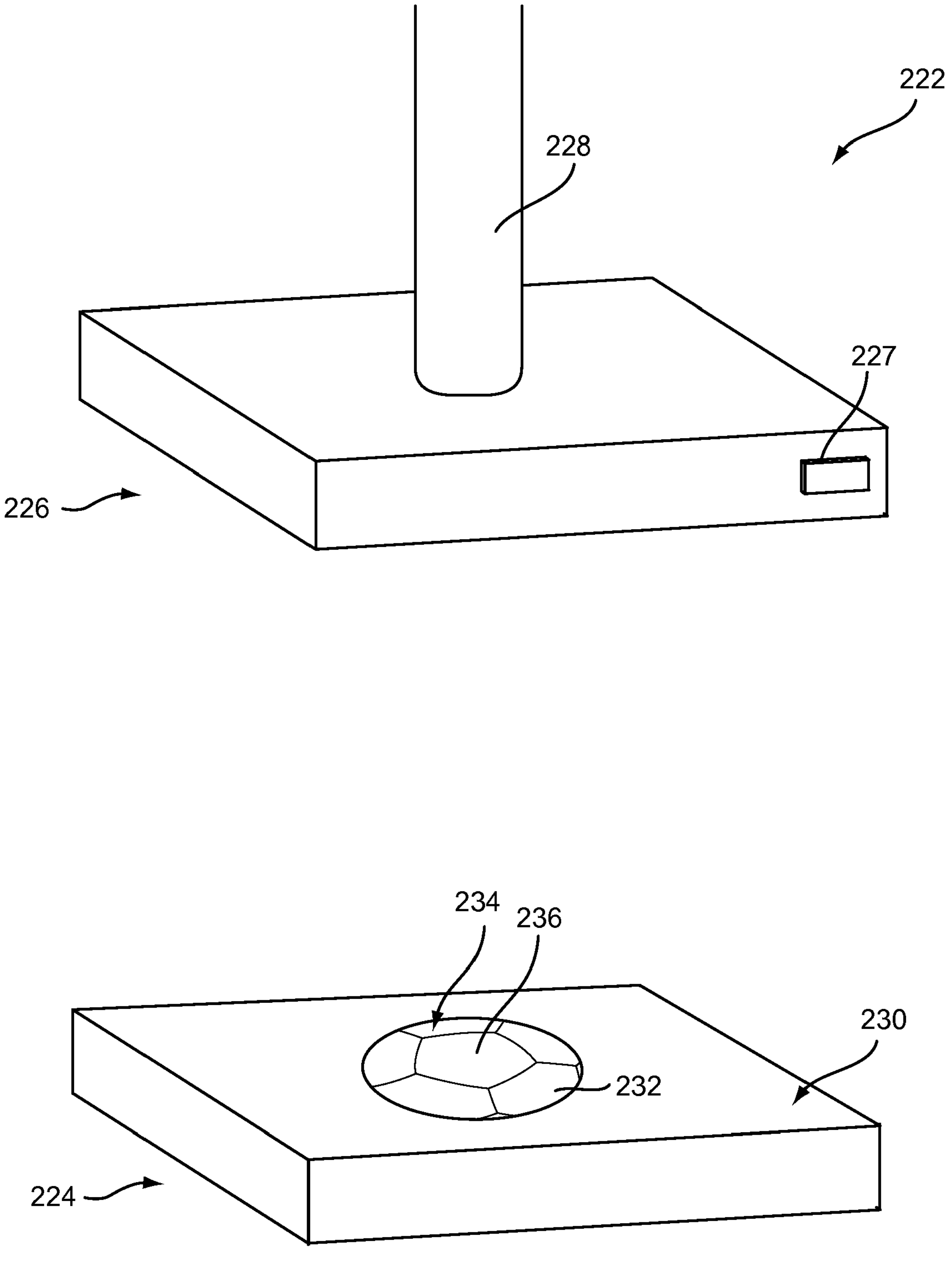
FIG. 9 is a schematic diagram of a preferred embodiment of a press assembly in a retracted.

FIG. 9 is a schematic diagram of a preferred embodiment of a press assembly in a retracted position. Referring to FIG. 9, press assembly 222 may comprise base portion 224 and heating portion 226. In some embodiments, heating portion 226 may include actuating rod 228. Actuating rod 228 may be used to move heating portion 226 either manually or mechanically toward base 224. Although the current embodiment includes a press assembly disposed in a generally vertical direction, with heating portion 226 disposed above base portion 224, in other embodiments, a press assembly could be oriented in any other direction. For example, in another embodiment, a press assembly could be oriented in a generally horizontal direction, with a base portion disposed beside a heating portion in a generally horizontal direction. In still other embodiments, other orientations for a press assembly are possible.

Heating portion 226 may be configured to heat up in order to facilitate thermal transfer of a graphic transfer assembly to a customizable article. In some cases, heating portion 226 may also be associated with switch 227. Preferably, switch 227 may be used to begin heating press assembly 222.

Base portion 224 may include upper surface 230. Upper surface 230 may be configured to face heating portion 226. Upper surface 230 may further include recess 232. In a preferred embodiment, recess 232 may be configured with a shape that corresponds to a portion of a customizable article. Additional alignment features 234, such as protrusions and/or depressions, may be arranged as shape 236 and included within recess 232 to align and position the selected piece of the customizable article. Preferably, alignment features 234 are constructed so that the area of the customizable article targeted to receive the graphic faces heating portion 226. With this arrangement, as a customizable article is placed on upper surface 230, the customizable article may be configured to sit within recess 232 in a manner that helps facilitate the alignment of the customizable article with heating portion 226.

In different embodiments, the arrangement and shape of additional alignment features 234 may vary. Additional alignment features may be configured in any arrangement or shape that may assist in aligning the selected customizable article. In an exemplary embodiment shown in FIG. 9, alignment features 234 are depressions that mirror the pattern of panels on a soccer ball. The arrangement and shape may allow a customizable article to be placed within recess 232 and easily adjusted so that a panel of the customizable article selected to receive graphic 218 may be positioned facing heating portion 226. However, in other embodiments, alignment features 234 may have a different arrangement and shape reflective of a different size and/or shape of a customizable article.

In different embodiments, the shape and size of recess 232 may vary. The shape and size of recess 232 generally depends on the shape and size of the customizable article being customized. Preferably, the shape and size of recess 232 follows the contours of at least a portion of the customizable article. With this arrangement, recess 232 receives the customizable article so that the customizable article may be easily positioned opposite heating portion 226. In the exemplary embodiment, shown in FIG. 9, recess 232 is a partial sphere and may receive a customizable article such as a ball. However, in other embodiments, recess 232 may not be configured for a specific shape or size of an article. This may allow different types of articles to be used with the same recess. For example, balls of varying sizes may be positioned in the same recess.

In another embodiment, recess 232 may be formed on a removable plate connected to upper surface 230. In such an embodiment, the plate may be removed and replaced by a different plate with a recess 232 of varying shape or size. In this manner, press assembly 222 may be able to receive different types of customizable articles.

Figure 10:
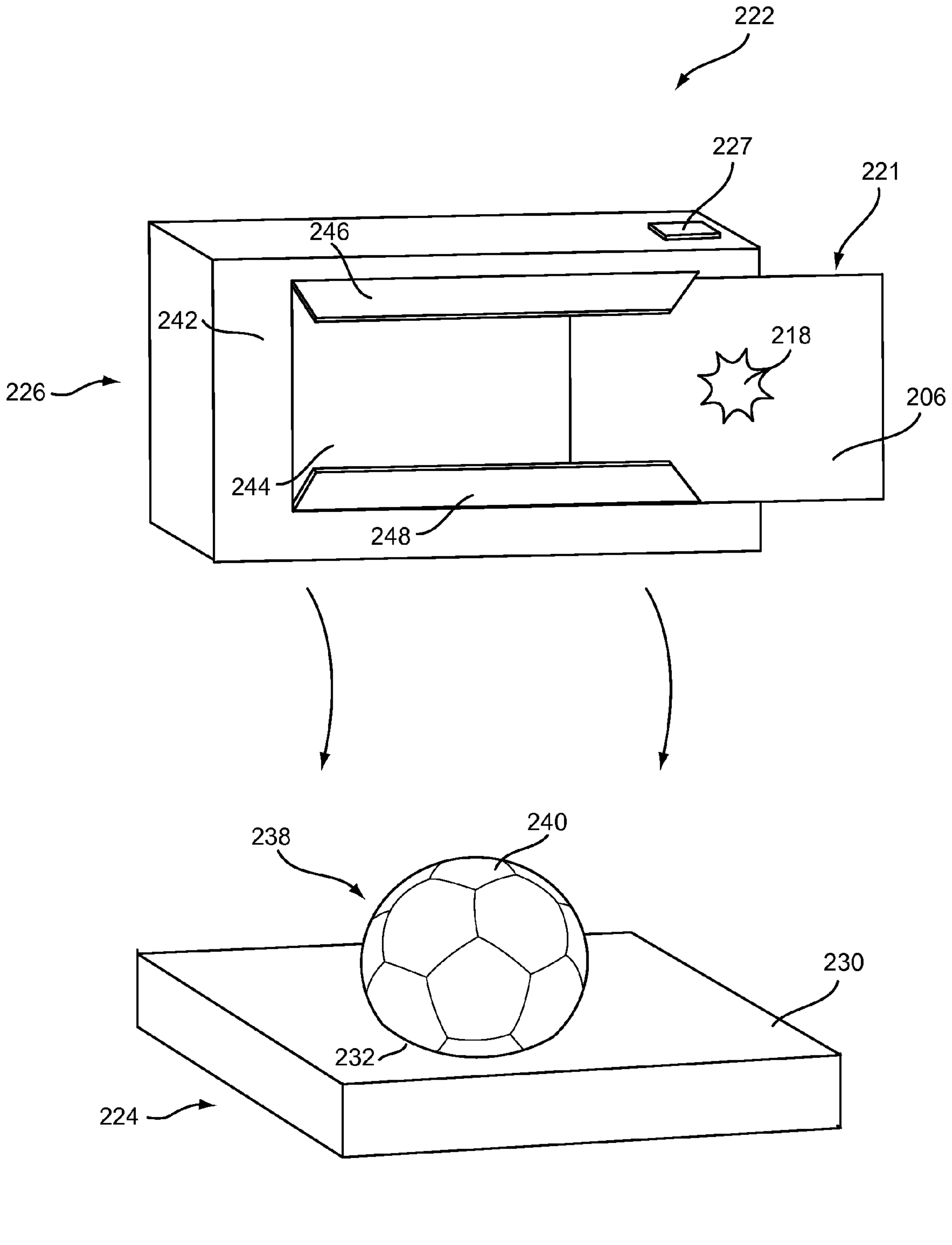
FIG. 10 is a schematic diagram of a preferred embodiment of a press assembly with the heating portion rotated.

FIG. 10 is a schematic diagram of a preferred embodiment of a press assembly with the heating portion rotated. Heating portion 226 is in a rotated position to illustrate the location of graphic transfer assembly 221 and graphic alignment feature 244. Heating portion 226 generally does not assume this position during use. Referring to FIG. 10, a portion of customizable article 238 may be positioned within recess 232 of upper surface 230.

In the current embodiment, customizable article 238 is a soccer ball. However, it should be understood that in other embodiments, customizable article 238 could be another type of customizable article, including any of the types of articles discussed earlier in this detailed description.

Target panel 240 of customizable article 238 may be aligned to face heating portion 226. Heating portion 226 may include graphic alignment side 242 where graphic alignment feature 244 is disposed. Graphic alignment feature 244 may be designed to retain and align graphic transfer assembly 221 prior to the start of the pressing process.

In the current embodiment, panel 240 is a portion of a soccer ball. However, in other embodiments, a panel could be any segmented portion of a customizable article. The term "segmented portion" as used throughout this detailed description and in the claims refers to any distinct region of a customizable article. In some cases, a segmented portion could be a substantially flat portion. In other cases, a segmented portion could be curved. In a preferred embodiment, the boundaries of a segmented portion may be defined by one or more contours of a customizable article. It should be understood, however, that the current method for applying a graphic to a customizable member is not limited to customizable members with panels or segmented portions. In other embodiments, for example, a graphic could be applied to a customizable member with a substantially rounded surface without panels or segmented portions, such as a basketball.

Heating portion 226 generally includes electrical and other components to heat graphic transfer assembly 221 to a transfer temperature. Heating portion 226 may also be capable of heating graphic transfer assembly 221 to varying transfer temperatures. The transfer temperature may depend on the construction of the selected customizable article.

Generally, heating portion 226 may be powered in any manner. In some embodiments, heating portion 226 may be powered by an electrical power source. Examples of electrical power sources include, but are not limited to standard outlets, generators and batteries as well as other types of electrical power sources.

Switch 227 may be provided to control the transfer temperature of heating portion 226. In varying embodiments, switch 227 may have a number of forms. For example, switch 227 may be a button, a dial, or a knob. Switch 227 may allow heating portion 226 to be turned on to a specific transfer temperature, adjusted to a different transfer temperature, and turned off. Switch 227 may be located on any surface of heating portion 226. In a preferred embodiment, switch 227 is located where an individual may easily locate and control switch 227.

In different embodiments, the configuration of graphic alignment feature 244 may vary. In an exemplary embodiment shown in FIG. 10, graphic alignment feature 244 includes a first holder 246 and a second holder 248. First holder 246 and second holder 248 may each releasably retain and receive a portion of graphic transfer assembly 221.

In different embodiments, the location, size, and shape of graphic alignment feature 244 may vary. Graphic alignment feature 244 may be any configuration, size, and shape that can be disposed on graphic alignment side 242 to releasably retain graphic transfer assembly 221. In a preferred embodiment shown in FIG. 10, first holder 246 and second holder 248 may be centered and extend along a length of graphic alignment side 242 to retain two edges of graphic transfer assembly 221. The size and shape of first holder 246 and second holder 248 may be similar to the contour of graphic transfer assembly 221. In a preferred embodiment, first holder 246 and second holder 248 are approximately V-shaped members that extend away from graphic alignment side 242. However, in other embodiments, the configuration, shape, and size of first holder 244 and second holder 246 may vary. In other embodiments, the number of holders may also vary.

In some embodiments, holders may be shaped and positioned to receive the corners of graphic transfer assembly 221. In another embodiment, four holders may be used to receive graphic transfer assembly 221. In yet another embodiment, graphic alignment feature 244 may be a grid disposed on graphic alignment side 242. The grid allows an individual to eyeball the center of graphic alignment side 242 and position graphic transfer assembly 221 accordingly.

As previously discussed and shown in FIG. 2, the operation of press assembly 222 may involve a number of steps. Initially, graphic transfer assembly 221 may be aligned on graphic alignment side 242 as shown in FIG. 10. In a second step 112, customizable article may be aligned on upper surface 230. As illustrated in FIG. 10, customizable article 238 may be positioned on upper surface 230 with panel 240 facing heating portion 226.

Next, heating portion 226 may be turned on by using switch 227. Heating portion 226 may be left on for some time to heat to the desired transfer temperature. During this period, graphic transfer assembly 221 is heated. Film transfer layer 206 may be softened and readied for bonding to customizable article panel 240 located on an exterior surface of customizable article 238.

Figure 11:
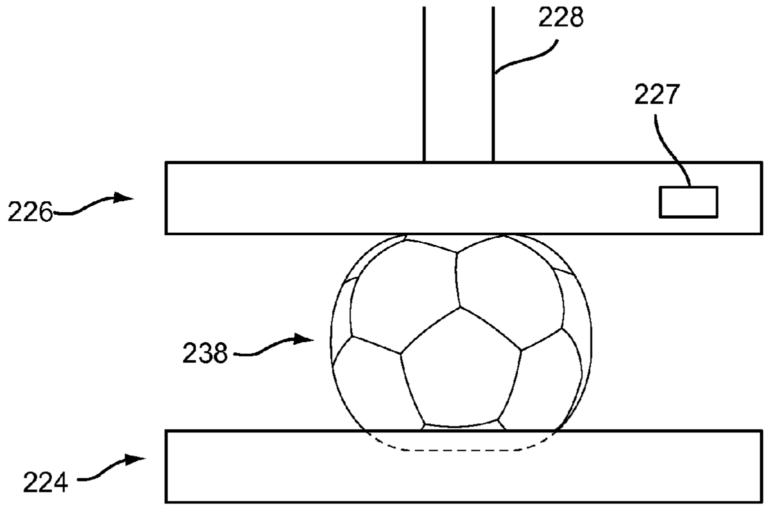
FIG. 11 is a schematic diagram of a preferred embodiment of a press assembly in an extended position.

FIG. 11 is a schematic diagram of a preferred embodiment of a press assembly in an extended position. At this point, heating portion 226 may be moved to an extended position where heating portion 226 may be pressed against customizable article 238 for a predetermined period of time. Following this, heating portion 226 may be moved to a retracted position away from customizable article 238. In this manner, graphic transfer assembly 221 may be adhered to customizable article 238 as shown in FIG. 12.

Figure 12:
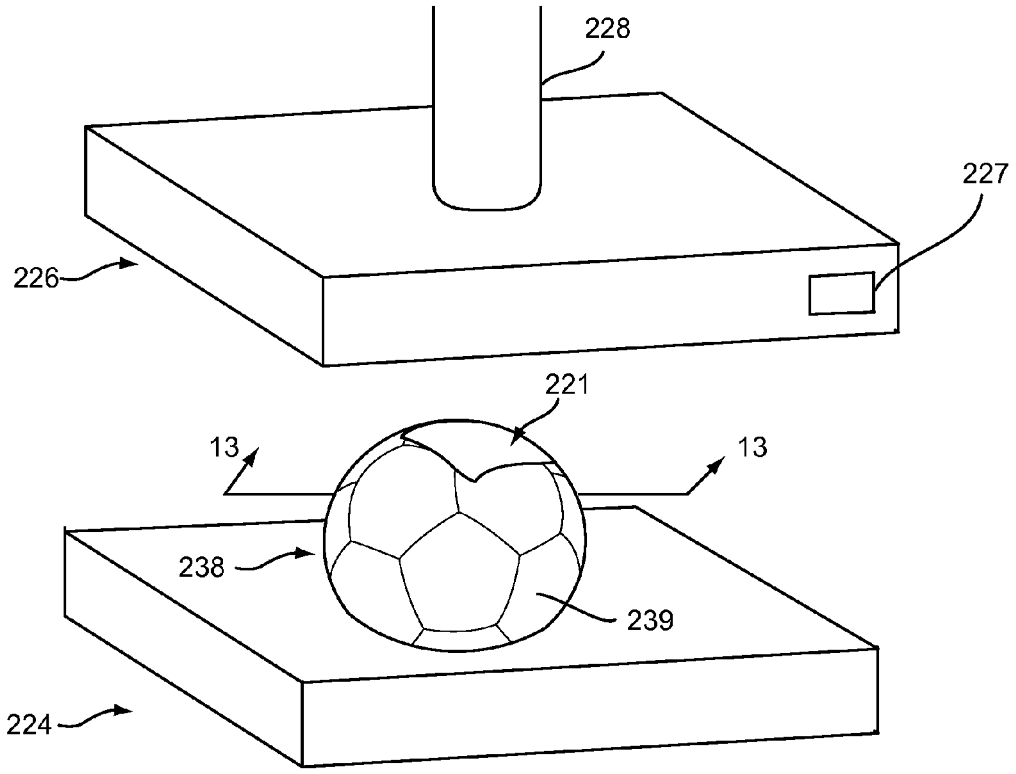
FIG. 12 is a schematic diagram of a preferred embodiment of a press assembly in a retracted position after the completion of the application process.
Figure 13:
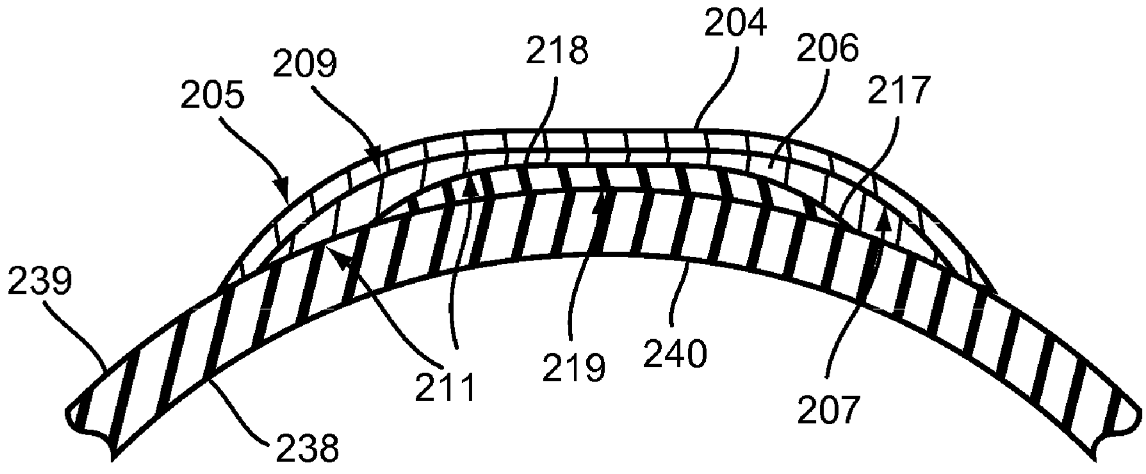
FIG. 13 is a schematic cross-sectional diagram of a preferred embodiment of the customizable article shown in FIG. 12.

FIG. 13 is a schematic cross-sectional diagram of a preferred embodiment of the customizable article shown in FIG. 12. Referring to FIG. 13, after the application of graphic transfer assembly 221, graphic second side 219 may be in contact with customizable article 238 at panel 240. Additionally, film layer second side 211 may contact exterior customizable article surface 239 and graphic first side 217. In a preferred embodiment, film layer second side 211 may bond with exterior customizable article surface 239. In some cases, carrier layer second side 207 primarily contacts film layer first side 209 and a portion may also contact exterior customizable article surface 239. In embodiments where film transfer layer 206 may be inverted in order to apply the film transfer layer to a customizable article, the graphic layer may be printed as the mirror image of the intended final graphic. For example, in embodiments where a graphic is a word, the mirror image of that graphic can be applied to a film transfer layer. Then, as the film transfer layer is inverted while being applied to the customizable article, the resulting graphic may have the proper orientation when viewed through the film transfer layer.

As previously discussed, any type of customizable article may be used. In some embodiments, it may be preferable to use a customizable article that includes an exterior polyurethane layer. With this arrangement, a film transfer layer made of polyurethane may be configured to easily bond with the surface of the customizable article during the customization process. For example, in some embodiments a soccer ball may be pre-configured with a polyurethane coating. Using this arrangement, the film transfer layer may easily bond with the exterior surface of the soccer ball during heating and pressing of the film transfer layer. It should be understood, however, that this customization process is not limited to customizable articles with pre-configured layers of polyurethane. In other embodiments, a customizable article could have any type of exterior surface.

Referring back to FIG. 12, following the application of graphic transfer assembly 221 to customizable article, heating portion 226 may be turned off. At this point, the customizable article, customizable article 238, may be removed from press assembly 222.

Figure 14:
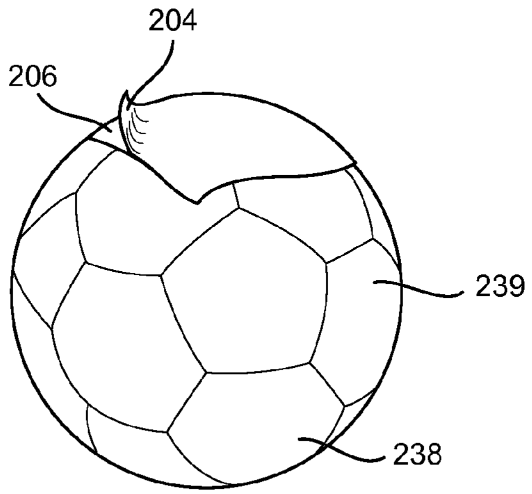
FIG. 14 is a schematic diagram of a preferred embodiment of a customizable article with the carrier layer being peeled away.

In order to prepare customizable article 238 for use, carrier layer 204 may be removed. FIG. 14 is a schematic diagram of a preferred embodiment of a customizable article with the carrier layer being peeled away. Referring to FIG. 14, carrier layer 204 may be peeled away by hand from customizable article 238 leaving film transfer layer 206 and graphic 218 disposed on customizable article 238. Although a carrier layer is used in the preferred embodiment, in other embodiments, a carrier layer may not be used. In other words, in different embodiments, film transfer layer may be optionally associated with a carrier layer. For example, in embodiments using a relatively stiff film transfer layer, a graphic can be printed directly to the film transfer layer without the use of a carrier layer.

Upon removal of the carrier layer 204 customizable article 238 may be inspected. The inspection may include confirming that exterior surface 239 of customizable article 238 remained intact during the application process. The inspection may also include confirming the proper application of graphic 218 and film transfer layer 206. If film transfer layer 206 did not properly bond to exterior surface 239 of customizable article 238, customizable article 238 may be repositioned in press assembly 222. When reapplying heat, an unused piece of carrier paper may be used between customizable article 238 and heating portion 226 as a precaution to protect customizable article 238 from the applied heat.

Figure 15:
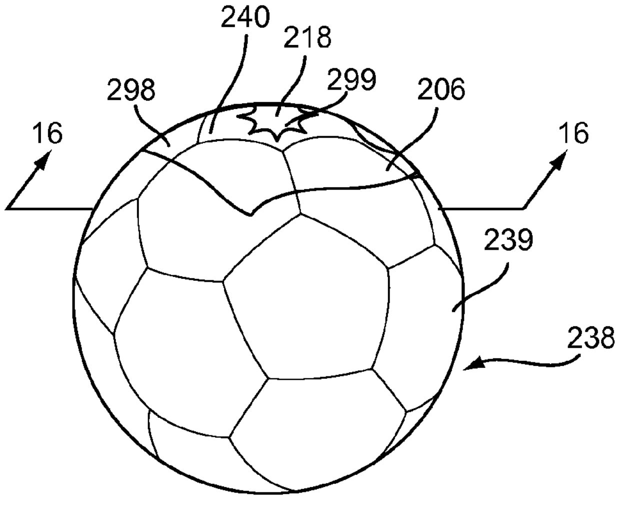
FIG. 15 is a schematic diagram of a preferred embodiment of customizable article at the completion of the graphical image transfer process.
Figure 16:
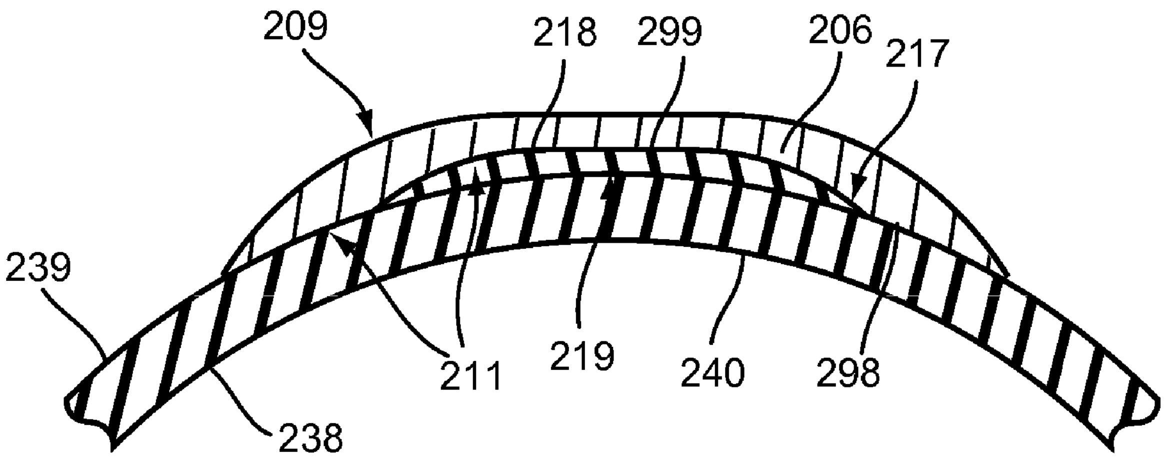
FIG. 16 is a schematic cross-sectional diagram of a preferred embodiment of customizable article shown in FIG. 15.

FIG. 15 is a schematic diagram of a preferred embodiment of a customizable article at the completion of the graphical image transfer process. FIG. 16 is a schematic cross-sectional diagram of a preferred embodiment of the customizable article shown in FIG. 15. Referring to FIGS. 15-16, graphic 218 and film transfer layer 206 may be disposed on exterior surface 239 of customizable article 238 at targeted panel 240. Because film transfer layer 206 is preferably clear, graphic 218 may be viewed through film transfer layer 206.

As previously discussed, film transfer layer 206 may be configured to bond with exterior surface 239. In some embodiments, film transfer layer 206 may comprise central portion 299. Generally, central portion 299 may be a portion of film transfer layer 206 that corresponds with graphic 218. In other words, central portion 299 may be configured to contact graphic 218 directly. Film transfer layer 206 may also include peripheral portion 298 that is generally disposed outwards of central portion 299.

Referring to FIG. 16, peripheral portion 298 may be bonded directly with exterior surface 239 of customizable article 238. Additionally, graphic 218 may be sandwiched between central portion 299 and exterior surface 239. With this arrangement, graphic 218 may not need to bond directly with exterior surface 239. Instead, graphic 218 is held in place by film transfer layer 206, since peripheral portion 298 is attached directly to exterior surface 239.

It should be noted that FIG. 13, as well as FIG. 16, are shown greatly enlarged and exaggerated. This is necessary to show all of the various layers and details of these embodiments. In some embodiments resembling commercial products, the various layers shown in FIGS. 13 and 16 may be so thin, they are undetectable by unaided human inspection. Additionally, the layers may be designed to be compatible or similar to other portions of the customizable article so that the resulting product appears to simply be an article that includes some kind of customization. In other words, the layers used to associate and protect the graphic are generally indistinguishable from the other portions of the article.

This method of a applying a graphic to a customizable article may provide for increased durability over other graphical applications. For example, this method may increase the durability of a graphic over traditional sublimation methods that apply an ink directly to a substrate. In such methods, ink bonded directly to a substrate may wear off in a shorter period of time due to the nature of the bonds between the ink and the substrate. In contrast, in the proposed method, the ink is bonded to a film, rather than a substrate. Furthermore, the film transfer layer is bonded directly with the substrate of the customizable article.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A customizable article comprising:

an exterior polyurethane layer;

a graphic created by a pigment arrangement disposed between the exterior polyurethane layer and a film transfer layer;

the film transfer layer being larger in surface area than the graphic; wherein the film transfer layer is a polyurethane layer;

the film transfer layer having a central portion corresponding with the graphic and having a peripheral portion disposed outward from the central portion and surrounding the central portion;

wherein the graphic is disposed between the exterior polyurethane layer and the film transfer layer, and the peripheral portion of the film transfer layer is bonded to the exterior polyurethane layer;

wherein the peripheral portion of the film layer stays fixed to the exterior polyurethane layer; and wherein the customizable article is a ball.

2. A customizable article according to claim 1, wherein the peripheral portion of the film transfer layer is directly bonded to the exterior polyurethane layer.

3. A customizable article according to claim 1, wherein the film transfer layer has a smaller surface area than the surface area of the exterior polyurethane layer.

4. The customizable article according to claim 3, wherein the graphic is not directly bonded to the exterior polyurethane layer.

5. A customizable article comprising:

an exterior polyurethane layer;

a graphic disposed between the exterior polyurethane layer of the customizable article and a film transfer layer;

wherein the customizable article is a ball;

the graphic having a first side contacting the exterior polyurethane layer of the customizable article;

the graphic having a second side contacting the film transfer layer, wherein the graphic contacts the film transfer layer at a central portion and the film transfer layer has a peripheral portion which is disposed outward of the central portion;

wherein the film transfer layer is a polyurethane layer; and wherein the peripheral portion of the film transfer layer is attached to the exterior polyurethane layer of the ball, such that the graphic is encased between the film transfer layer and the exterior polyurethane layer to shield the graphic when the ball is in use.

6. The customizable article according to claim 5, wherein the film transfer layer is directly bonded to the exterior polyurethane layer of the ball at the peripheral portion.

7. The customizable article according to claim 5, wherein the exterior polyurethane layer has more surface area than the surface area of the film transfer layer.

8. The customizable article according to claim 5, wherein the graphic contacts less than four-fifths of the film transfer layer.

9. The customizable article according to claim 5, wherein the ball is a soccer ball.

10. The customizable article according to claim 9, wherein the graphic is applied to a panel of the soccer ball.

11. The customizable article according to claim 5, wherein the film transfer layer is bonded to the exterior polyurethane layer by heating and softening the film transfer layer.

12. The customizable article according to claim 5, wherein the graphic is not directly bonded to the exterior polyurethane layer.

13. The customizable article according to claim 12, wherein the graphic is a pigment arrangement printed on the film transfer layer.

14. The customizable article according to claim 5, wherein the ball is a soccer ball which includes at least one panel and the graphic and the film transfer layer are disposed on the at least one panel.

* * * * *